(12) United States Patent
Vignet

(10) Patent No.: US 8,589,394 B2
(45) Date of Patent: Nov. 19, 2013

(54) SYSTEM AND METHOD FOR DYNAMICALLY CONFIGURING A MULTI-MODEL NODE TABLE

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 595 days.

(21) Appl. No.: 11/998,537

(22) Filed: Nov. 29, 2007

(65) Prior Publication Data
US 2009/0144314 A1   Jun. 4, 2009

(51) Int. Cl.
  *G06F 17/30*   (2006.01)
(52) U.S. Cl.
  USPC .......................................................... 707/736
(58) Field of Classification Search
  USPC .................................................. 707/999.102
  See application file for complete search history.

(56) References Cited

U.S. PATENT DOCUMENTS

| | | | |
|---|---|---|---|
| 2005/0050082 A1* | 3/2005 | Kuo | 707/102 |
| 2005/0138057 A1* | 6/2005 | Bender et al. | 707/102 |
| 2006/0026154 A1* | 2/2006 | Altinel et al. | 707/5 |
| 2006/0074967 A1* | 4/2006 | Shaburov | 707/102 |
| 2007/0150562 A1* | 6/2007 | Stull et al. | 709/223 |
| 2008/0109715 A1* | 5/2008 | Stover | 715/237 |
| 2008/0154921 A1* | 6/2008 | Bauchot et al. | 707/100 |

OTHER PUBLICATIONS

Leff et al. Web-Application Development Using the Model View Controller Design Pattern, published 2001 IEEE.*

* cited by examiner

*Primary Examiner* — Neveen Abel Jalil
*Assistant Examiner* — Kevin L Young
(74) *Attorney, Agent, or Firm* — Blakely Sokoloff Taylor & Zafman, LLP

(57) ABSTRACT

A system and method are described for dynamically generating a table containing data from multiple model nodes. For example, a computer-implemented method according to one embodiment of the invention comprises: displaying a plurality of attributes from multiple different nodes of an application; providing a user interface allowing a user to select attributes from the plurality of attributes to be displayed as columns within a table; receiving an identification of a set of attributes within the plurality of attributes selected by the user; and storing the identification of the set of attributes as configuration data within local data storage, the local data storage being separate from a system data storage in which program code and data for the application is maintained.

14 Claims, 13 Drawing Sheets

Fig. 7

| | | | | From RFC Call #1 710 | | | | | | Prices (From RFC Call #2 702) | | From RFC Call #1 701 |
|---|---|---|---|---|---|---|---|---|---|---|---|---|
| IconString | StructElemID | StructElmDesc | Type | Material | Plant | Quantity | UoM | Currency | Row Type | MoQ | QuanforCL |
| | 1000/100-100 | Spiral casing | 1MATERIAL | 100-100 | 1000 | 0 | EA | EUR | M | 3 | 30 |
| | 1000/100-100 | Spiral casing | 1MATERIAL | 100-100 | 1000 | 0 | EA | EUR | P | 5 | 25 |
| | 1000/100-100 | Spiral casing | 1MATERIAL | 100-100 | 1000 | 0 | EA | EUR | P | 6 | 36 |
| | 1000/100-130 | Hexagon head screw M10 | 1MATERIAL | 100-130 | 1000 | 0 | EA | EUR | M | 4 | 40 |
| | 1000/100-130 | Hexagon head screw M10 | 1MATERIAL | 100-130 | 1000 | 0 | EA | EUR | P | 6 | 26 |
| | 1000/100-130 | Hexagon head screw M10 | 1MATERIAL | 100-130 | 1000 | 0 | EA | EUR | P | 7 | 37 |
| | 1000/100-200 | Fly wheel GG | 1MATERIAL | 100-200 | 1000 | 0 | EA | EUR | M | 5 | 50 |
| | 1000/100-200 | Fly wheel GG | 1MATERIAL | 100-200 | 1000 | 0 | EA | EUR | P | 7 | 27 |
| | 1000/100-200 | Fly wheel GG | 1MATERIAL | 100-200 | 1000 | 0 | EA | EUR | P | 8 | 38 |
| | 1000/100-210 | Slug for fly wheel | 1MATERIAL | 100-210 | 1000 | 0 | EA | EUR | M | 6 | 60 |

Row 1 of 18

| IconString | StructElemID | StructElmDesc | Type | Material | Plant | Quantity | UoM | Currency | Row Type | MoQ | Material Price_6 | Valid From_7 | QuanforCL | Node_Id_1 | Fobj_Type_Name_2 | Cost_Element_3 | Created On_4 | Origin_5 |
|---|---|---|---|---|---|---|---|---|---|---|---|---|---|---|---|---|---|---|
| | 1000/100-100 | Spiral casing | 1MATERIAL | 100-100 | 1000 | 0 | EA | EUR | M | 3 | | | 30 | 4 | 1MATERIAL | 0000890000 | 3/2/2007 | 001 |
| | 1000/100-100 | Spiral casing | 1MATERIAL | 100-100 | 1000 | 0 | EA | EUR | P | 5 | 355.57 | 12/1/2006 | 25 | 4 | 1MATERIAL | 0000890000 | 3/2/2007 | 001 |
| | 1000/100-100 | Spiral casing | 1MATERIAL | 100-100 | 1000 | 0 | EA | EUR | P | 6 | 355.07 | 1/1/2007 | 36 | 4 | 1MATERIAL | 0000890000 | 3/2/2007 | 001 |
| | 1000/100-130 | Hexagon head screw M10 | 1MATERIAL | 100-130 | 1000 | 0 | EA | EUR | M | 4 | | | 40 | 5 | 1MATERIAL | 0000400000 | 7/24/2006 | 001 |
| | 1000/100-130 | Hexagon head screw M10 | 1MATERIAL | 100-130 | 1000 | 0 | EA | EUR | P | 6 | 0.51 | 12/1/2006 | 26 | 5 | 1MATERIAL | 0000400000 | 7/24/2006 | 001 |
| | 1000/100-130 | Hexagon head screw M10 | 1MATERIAL | 100-130 | 1000 | 0 | EA | EUR | P | 7 | 0.51 | 1/1/2007 | 37 | 5 | 1MATERIAL | 0000400000 | 7/24/2006 | 001 |
| | 1000/100-200 | Fly wheel GG | 1MATERIAL | 100-200 | 1000 | 0 | EA | EUR | M | 5 | | | 50 | 6 | 1MATERIAL | 0000890000 | 3/6/2007 | 001 |
| | 1000/100-200 | Fly wheel GG | 1MATERIAL | 100-200 | 1000 | 0 | EA | EUR | P | 7 | 56.45 | 12/1/2006 | 27 | 6 | 1MATERIAL | 0000890000 | 3/6/2007 | 001 |
| | 1000/100-200 | Fly wheel GG | 1MATERIAL | 100-200 | 1000 | 0 | EA | EUR | P | 8 | 56.45 | 1/1/2007 | 38 | 6 | 1MATERIAL | 0000890000 | 3/6/2007 | 001 |
| | 1000/100-210 | Slug for fly wheel | 1MATERIAL | 100-210 | 1000 | 0 | EA | EUR | M | 6 | | | 60 | 7 | 1MATERIAL | 0000400000 | 7/24/2006 | 001 |

Row 1 of 18

New Columns From RFC Call #1 — 901

New Columns From RFC Call #2 — 902

Prices

Fig. 9

SYSTEM AND METHOD FOR DYNAMICALLY CONFIGURING A MULTI-MODEL NODE TABLE

BACKGROUND

1. Field of the Invention

This invention relates generally to the field of data processing systems. More particularly, the invention relates to a system and method for dynamically configuring a table with data from multiple model nodes.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 1c illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 1c, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

SUMMARY

A system and method are described for dynamically generating a table containing data from multiple model nodes. For example, a computer-implemented method according to one embodiment of the invention comprises: displaying a plurality of attributes from multiple different nodes of an application; providing a user interface allowing a user to select attributes from the plurality of attributes to be displayed as columns within a table; receiving an identification of a set of attributes within the plurality of attributes selected by the user; and storing the identification of the set of attributes as configuration data within local data storage, the local data storage being separate from a system data storage in which program code and data for the application is maintained.

BRIEF DESCRIPTION OF THE DRAWINGS

A better understanding of the present invention can be obtained from the following detailed description in conjunction with the following drawings, in which:

FIG. 7 illustrates an exemplary table with node attributes represented by columns.

FIG. 9 illustrates an exemplary table resulting from the implementation of one embodiment of the invention.

DETAILED DESCRIPTION OF PREFERRED EMBODIMENTS

Described below is a system and method for dynamically configuring a table with data from multiple model nodes. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1A:
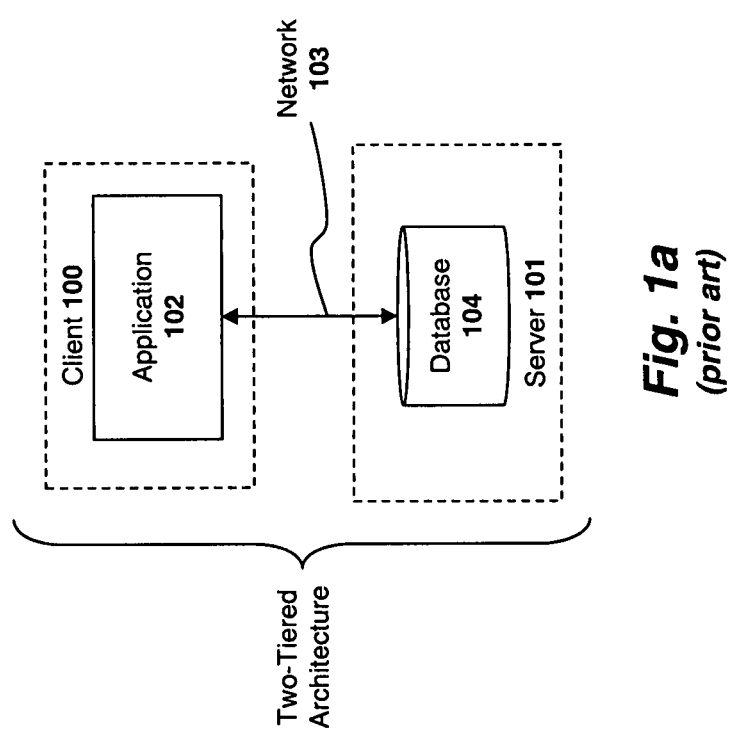
FIG. 1a illustrates a traditional two-tier client-server architecture.
Figure 1B:
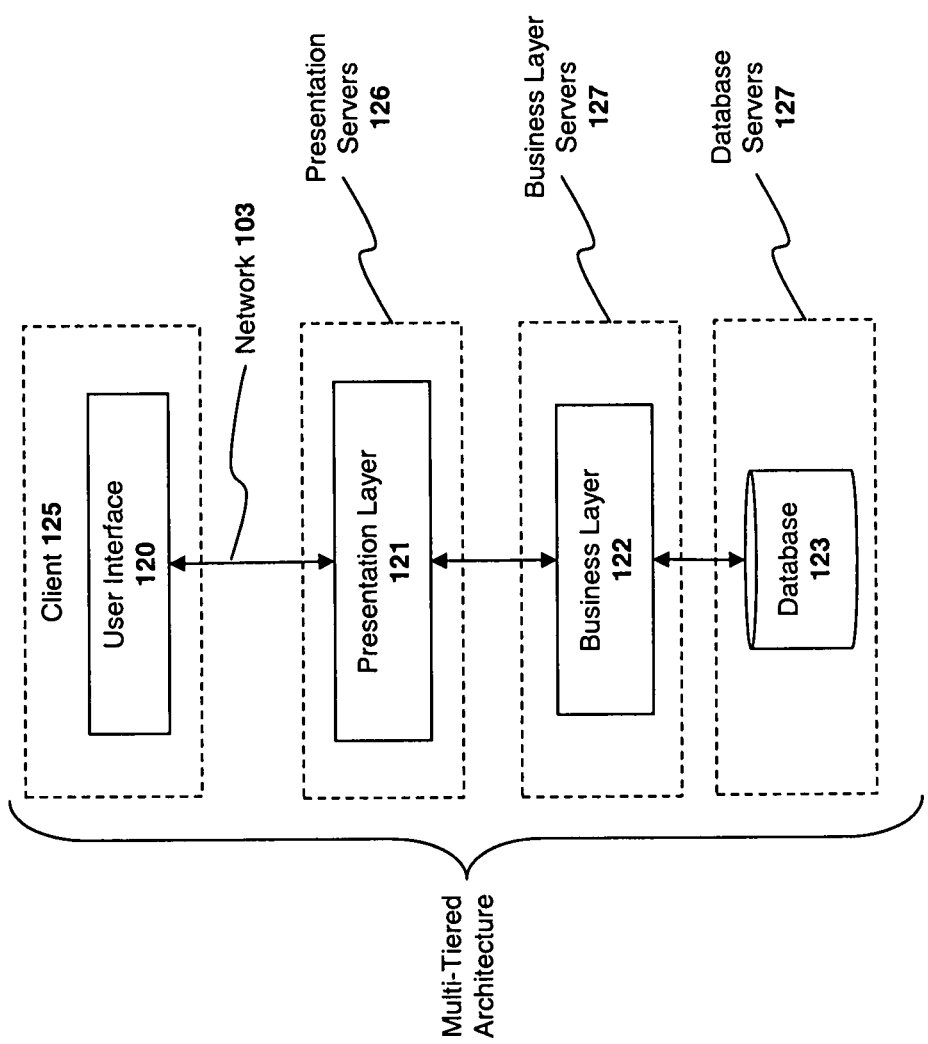
FIG. 1b illustrates a prior art multi-tier client-server architecture.
Figure 1C:
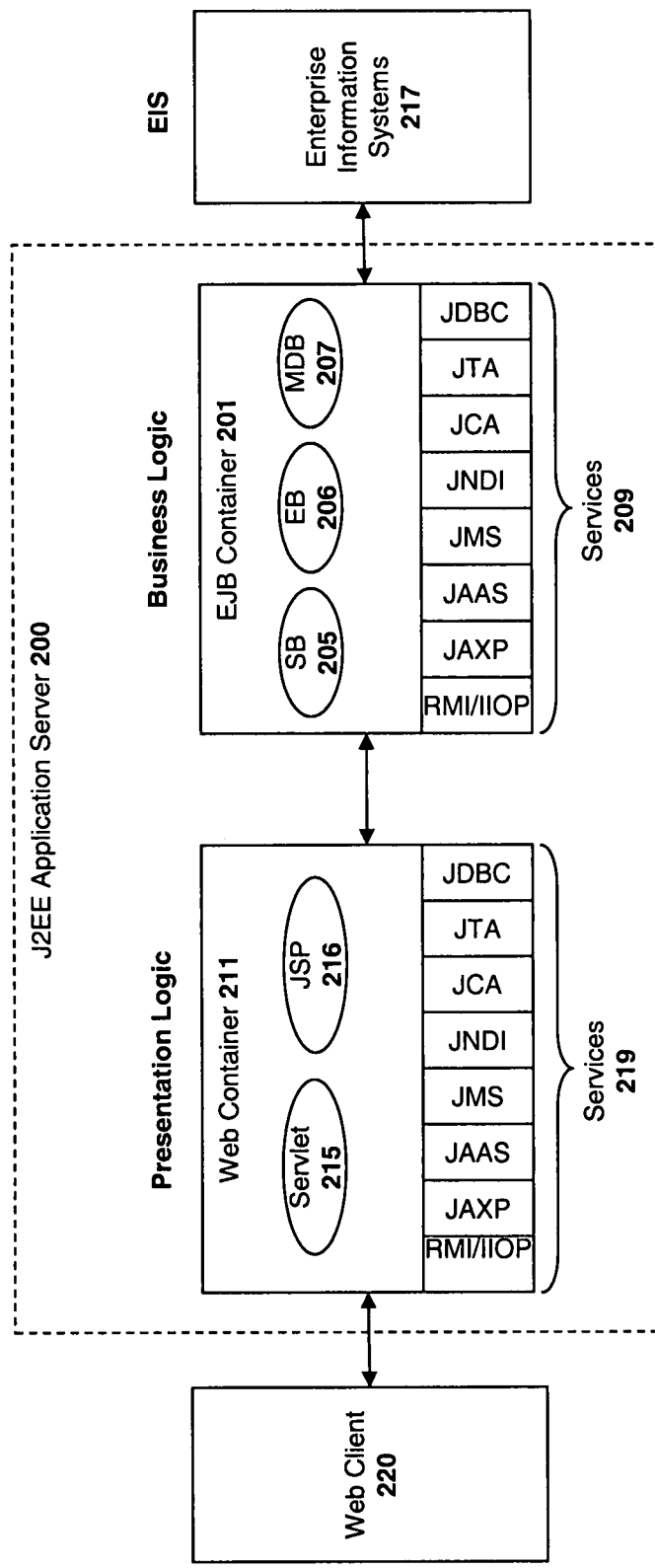
FIG. 1c illustrates a multi-tiered application server architecture according to the Java 2 Enterprise Edition ("J2EE") standard.
Figure 2A:
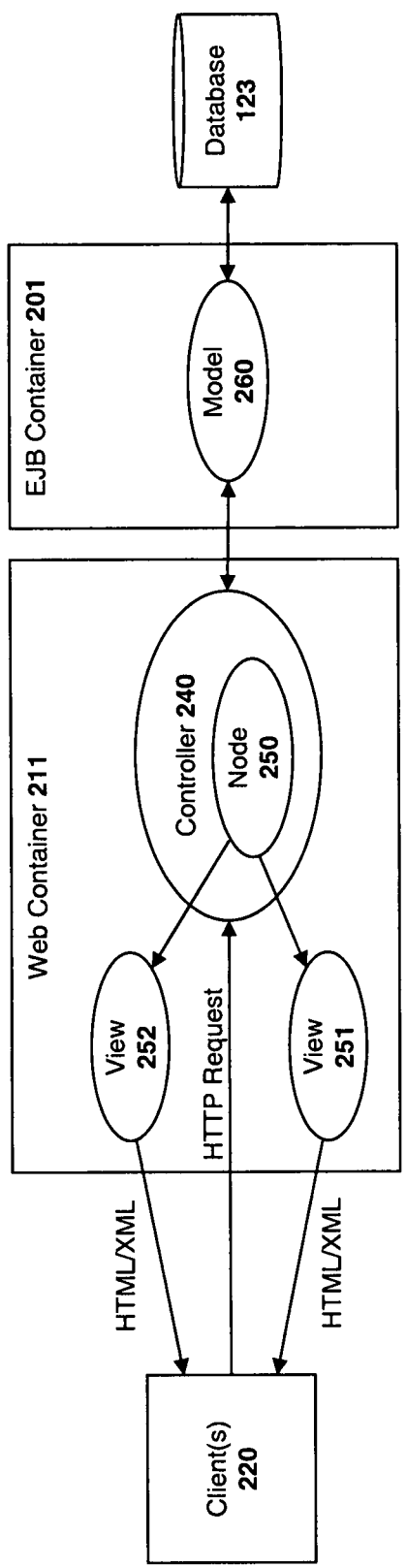
FIGS. 2a-b illustrate a model view controller ("MVC") architecture implemented in accordance with one embodiment of the invention.

The display of data records in tables and forms, and the associated editing of the tables and forms (e.g., selecting, deleting, sorting, etc) by clients are central functions in Web-based applications. Thus, various techniques are provided within the J2EE architecture for creating and working with tables in response to client requests. In particular, under a model-view-controller ("MVC") architecture, illustrated in FIG. 2a, Web-based content using tables may be created within the Web Container 211 using "controllers" 240 and "views" 251-252 that operate in conjunction with "models" 260 within the EJB container 201. A detailed description of the MVC architecture is beyond the scope of the present application but, briefly, the controller 240 manages the underlying table structure and data, referred to in FIG. 2a as a context node 250. The table structure is presented to Web clients 220 in the form of one or more "views" 251-252 which indicate, for example, how the table is presented within a Web page. Controllers may be implemented by servlets and views by Java server pages. The model 260 within the EJB container 201 provides an interface between the controller 240 and the underlying table data stored within the database 123. See, e.g., GHALY and KOTHAPALLI mentioned above for additional detail on the MVC architecture at pages 148-152.

The view 252, 251 may be a table, in which case the table receives its data from a "multi element context node." At runtime, each element of the node is mapped to a table row. Thus, the number of table rows is identical to the number of node elements. The table columns are mapped to the context node attributes.

Various existing application server platforms employ a Model View Controller architecture to generate views for requesting clients. For example, "Web Dynpro" is a programming paradigm developed by SAP AG (the assignee of the present application) which implements a Model View Controller architecture for generating and displaying views (e.g., tables) to end users. While certain embodiments of the invention are described herein within the context of Web Dynpro, it should be noted that the underlying principles of the invention are not limited to any particular programming paradigm.

Figure 2B:
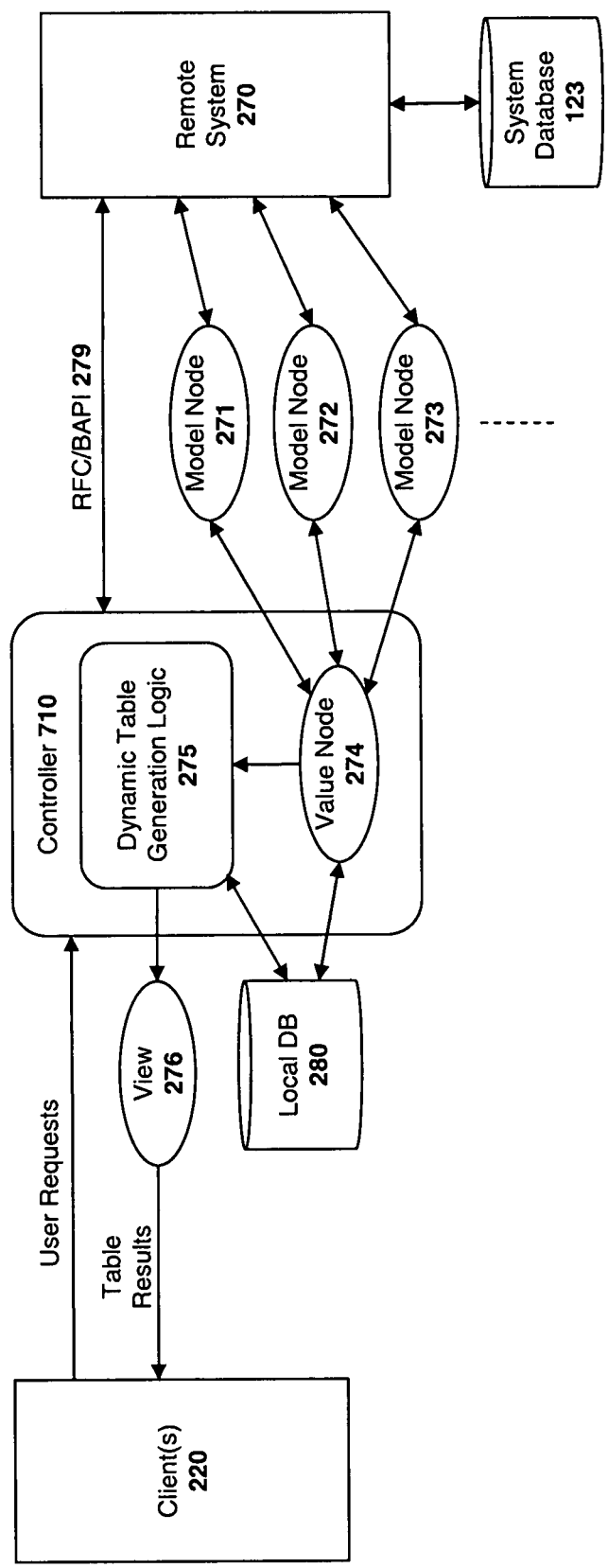

FIG. 2b illustrates additional details of one embodiment of the invention. Specifically, this embodiment includes dynamic table generation logic 275 for dynamically generating tables in response to user requests. In one embodiment, the dynamic table generation logic 275 allows a user to configure a table using the attributes of a plurality of different model nodes. This embodiment operates using two different types of nodes: value nodes 274 and model nodes 271-273. The difference between value nodes and model nodes is that a value node saves the data itself, whereas the mode node only references an external model object that saves the data.

A table view 276 shows data typically obtained from a persistent layer, illustrated as remote system 270 and system database 123 in FIG. 2b. In one embodiment, the remote system 270 is an R/3 system designed by SAP AG (the assignee of the present application). The data are obtained from the remote system 270 using a Remote Function Call ("RFC") or Business Application Programming Interface (BAPI) 279. While the remainder of this application will refer to an RFC, the underlying principles of the invention are not limited to any particular protocol.

Figure 3:
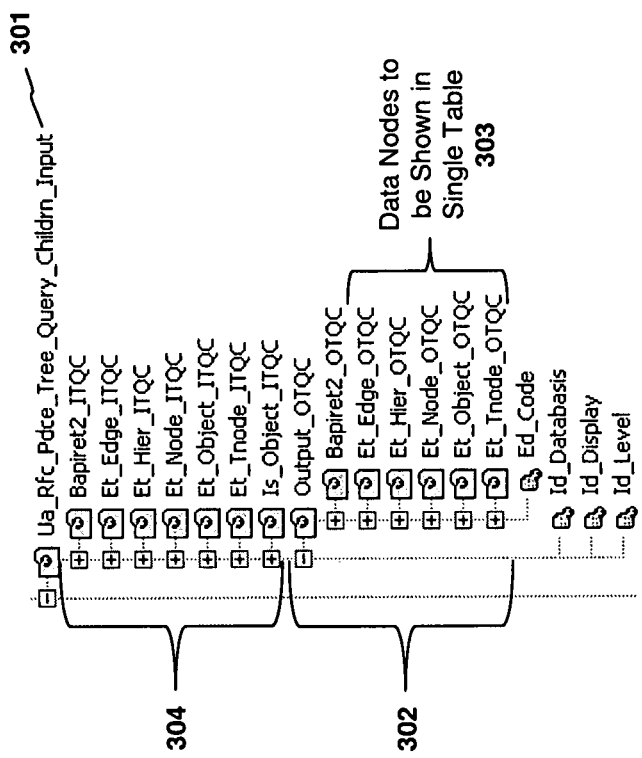
FIG. 3 illustrates an exemplary context model node resulting from a remote function call ("RFC").
Figure 4:
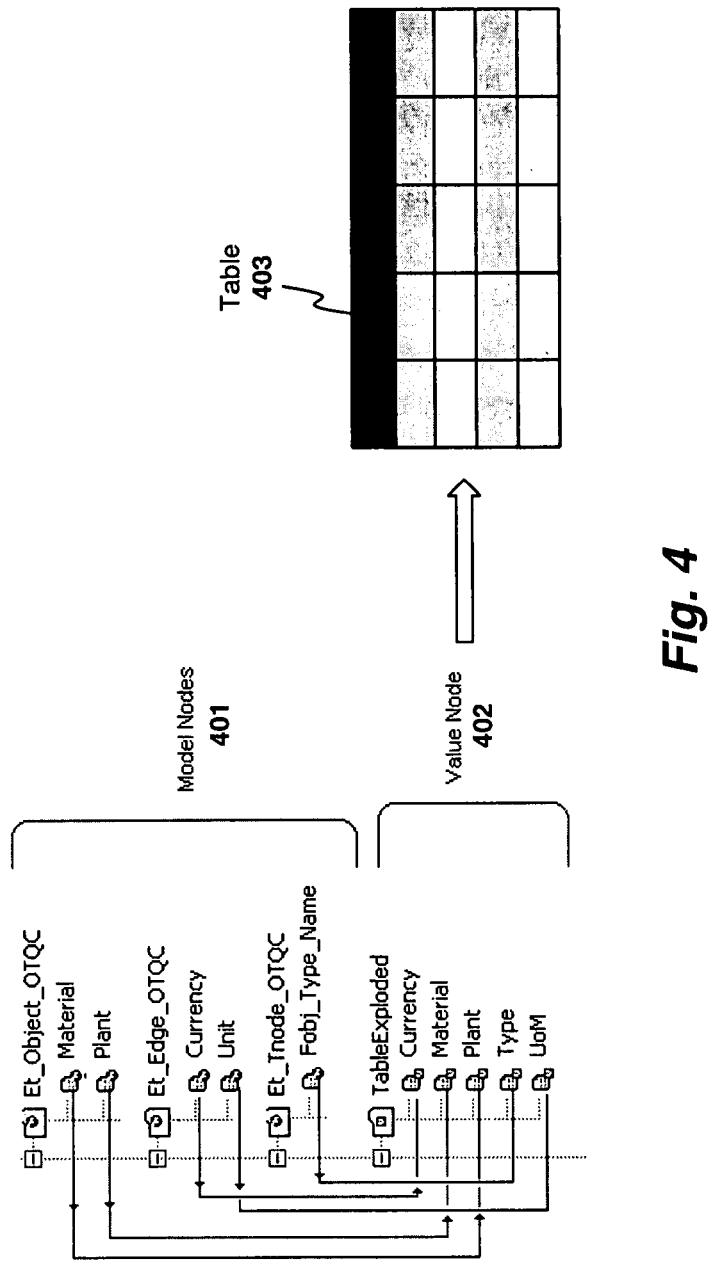
FIG. 4 illustrates how a value node is populated with data from RFC output model nodes.

A called RFC 279 populates a model node 271-273 with data. FIG. 3 illustrates an exemplary context model node 301 from an RFC called Ua_Rfc_Pdece_Tree_Query_Childrn_Input, which is made of input nodes 304 (ending in "ITQC" in the example), and output nodes 302 (ending in "OTQC"). A remote system 270 provides data that are located in the RFC output models nodes. In the example shown in FIG. 4, the RFC returns data in five output nodes 303. Rather than containing data, one of the nodes, Bapiret2_OTQC, has messages that indicate if the RFC call has been successful or has failed.

In certain architectures such as Web Dynpro, a table can only receive data from a single context node. Thus, if an RFC returns data that needs to be shown in more than one node, a value node 274 (illustrated in FIG. 2b) is created used as the source node of the table. The value node 274 is populated with data from the RFC output model nodes 271-273. In the example shown in FIG. 4, the value node 402, called "TableExploded," receives data from three different model nodes 401 from the same RFC output: Et_Object_OTQC, Et_Edge_OTQC, and Et_Tnode_OTQC. The data are transferred from these three RFC output model nodes to the table value node 402, TableExploded, in order to be displayed in one table 403.

In sum, a table is mapped to one and only one context node which is a value node if the table contains data provided by an RFC call which results in multiple output model nodes.

"Personalization" allows users or administrators adapt an application to their personal requirements. Current systems offer some personalization options at the table level and table column level. For example, an end user may hide or rearrange columns (e.g., moving columns left or right). However, the personalization tools used in current configurations do not allow users to add new columns.

Certain Collaborative Cross-Applications, or "xApps," designed by SAP AG offer an application called the "Configurator" that allows a user to create a table from an RFC call. The table is directly mapped to all elements of one output node of the RFC call, and the elements not intended to be shown are ignored. The table configuration is saved in a permanent data layer (e.g., within a system database 123). When it is time to generate the table, the configuration is called and the columns to be shown are built dynamically. One significant limitation, however, if that the Configurator allows a table to be mapped one and only one RFC output model node.

Figure 5:
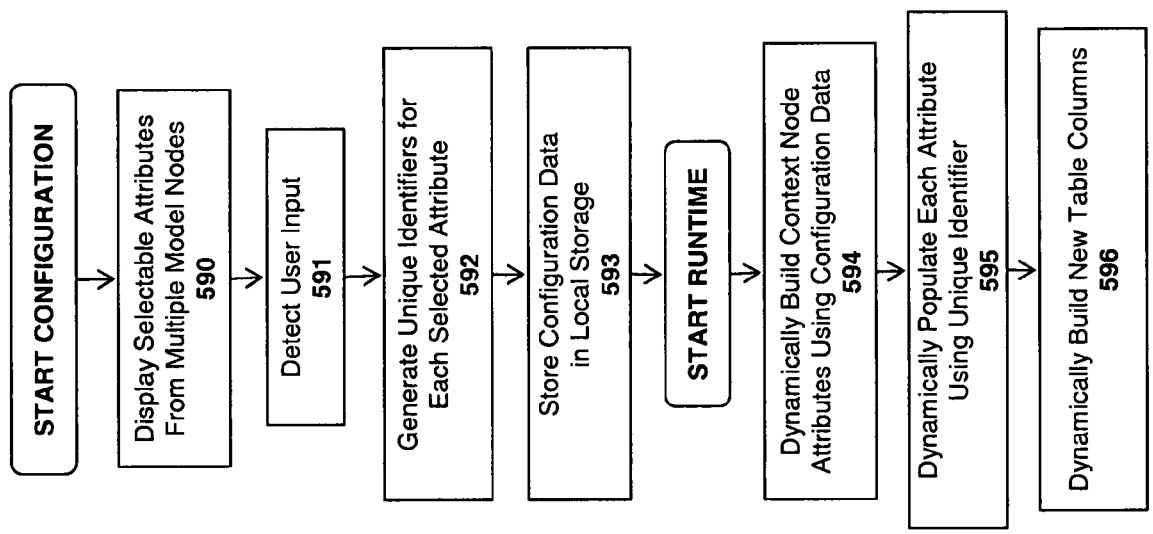
FIG. 5 illustrates a one embodiment of a method for dynamically configuring and generating a multi-model node table.
Figure 6:
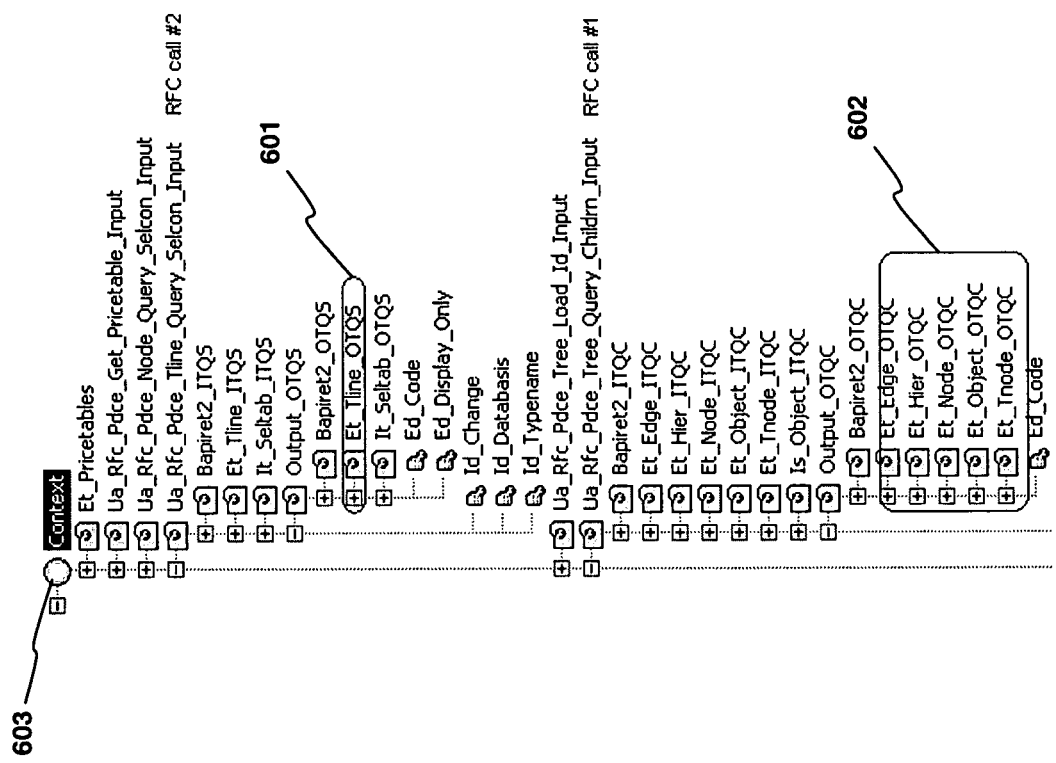
FIG. 6 illustrates six RFC output model nodes containing data to be displayed within a table.
Figure 8:
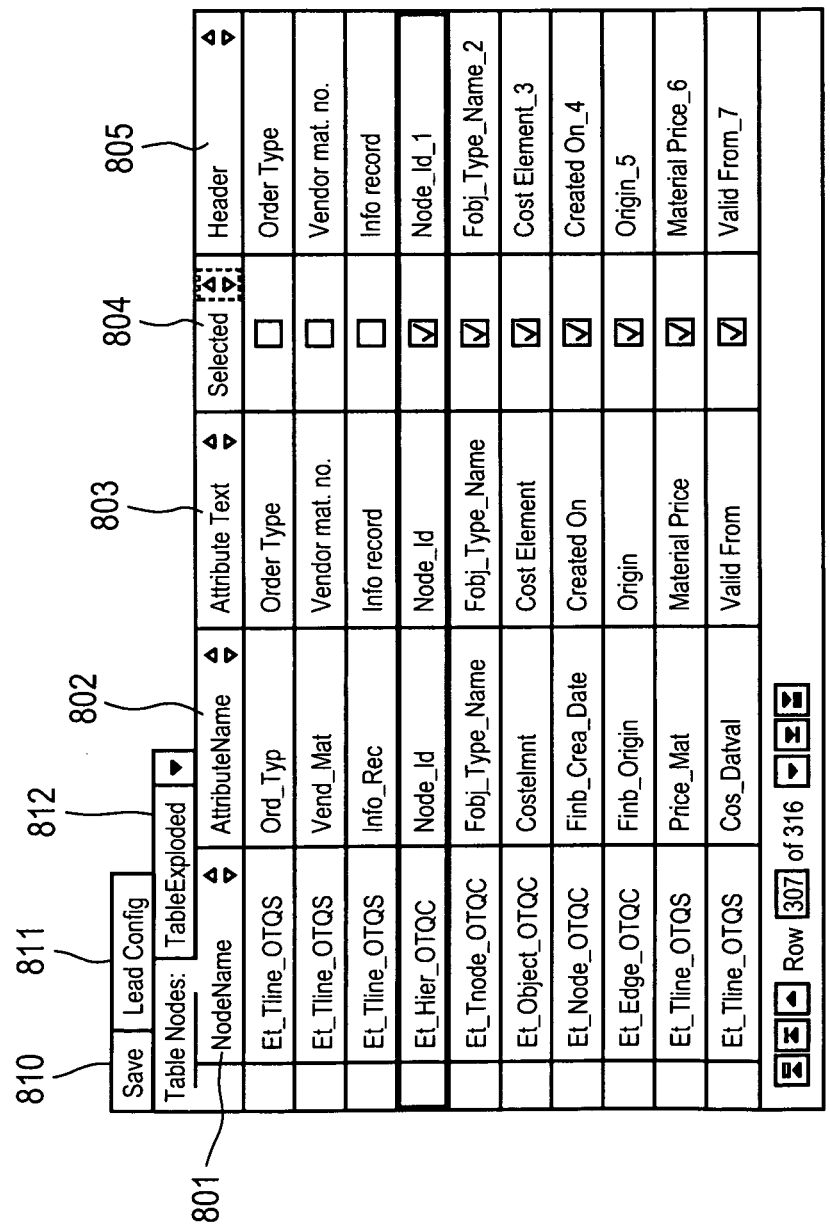
FIG. 8 illustrates a graphical user interface allowing a user to select attributes for a table from multiple nodes.

In contrast, the embodiments of the invention described herein allow an application administrator (or other user) to add new columns to a table whose data comes from any number of different RFC calls. One embodiment of a method implemented by the dynamic table generation logic 275 to perform this function is illustrated in FIG. 5. At 590, the attributes from a variety of different output model nodes are displayed for the user. One embodiment of a user interface for allowing the user to select attributes from multiple model nodes is illustrated in FIG. 8 (described below). At step the user's attribute selections are detected and at 592 unique identifiers are generated for each attribute selected by the user. As described below, in one embodiment, the unique identifier comprises the name of the context node combined with (e.g., appended to) the attribute name. At 593, configuration data containing the selected attributes is stored within a local storage such as the local database 280 shown in FIG. 2b.

In response to a user request from a client 220 at runtime, at 594, the dynamic table generation logic 575 dynamically builds the context node attributes of the table using the configuration data stored within the local database 580. In one embodiment, the new built attribute name is the name of the unique identifier generated in 592. At 595, the dynamic table generation logic 275 dynamically populates each newly created attribute by using its unique name. Its name indicates under which RFC output model node and attribute to select to retrieve the data. At 596, the dynamic table generation logic 275 dynamically builds the new table columns. In one embodiment, each new column has its own cell editor mapped to the corresponding attribute created in 594. As is known by those of skill in the art, the cell editor allows an end user or administrator to edit the contents of a cell when the table is not in "read only" mode.

One embodiment of the invention will be described with respect to FIGS. 6-9. This example employs six RFC output model nodes 601, 602 which are labeled Et_Edge_OTQC, Et_Hier_OTQC, Et_Node_OTOC, Et_Object_OTOC, Et_Tnode_OTQC, Et_Tline_OTQS. Note that all nodes whose names end with OTQC (identified as 602 in FIG. 6) are output model nodes from one RFC call, and the node which ends with OTQS (identified as 601 in FIG. 6) is an output model node from another RFC call. Consequently, this example uses output model nodes from two different RFC calls.

If the administrator does not know the name of the node, he can run a small help program that shows in the logger the names of all context nodes. The original table (prior to editing by the administrator) is illustrated in FIG. 7. A first series of columns 701 are provided for attributes from RFC call #1 and a second series of columns 702 are provided for attributes from RFC call #2. The columns 702 of the RFC call #2 are grouped columns under the header "Prices." By default, the RFC call #2 provides data for the two columns that are named "Row Type" and "MoQ" (Minimum Order Quantity).

In one embodiment, the dynamic table generation logic 275 shows all possible attributes of all nodes mentioned in the application property. In FIG. 8, the administrator selects the table node he wants to modify from drop down menu 812. In the illustrated example, the administrator has selected Table-Exploded. Once the table node selected from the drop down menu 812, all attributes of the nodes associated with the table in the application property are displayed. Columns are displayed for node name 801, attribute name 802, attribute text 803, selection boxes 804 (for selecting particular attributes), and header 805. In the illustrated example, the nodes have a total of 316 attributes (although only 10 attributes/rows are displayed in FIG. 8).

In one embodiment, the administrator selects the additional attributes to add to the table 700 as columns by checking selection boxes 804 for the rows associated with the attributes. For example, in FIG. 8, the attribute Node_Id of node Et_Hier_OTQC has been selected by checking the checkbox within row 820. Once a set of attributes has been selected in this manner, the administrator saves the configuration by selecting the save button 810. The configuration, including the newly-selected attributes, is then saved within the local database 280 and subsequently used to generate the table. If the administrator wants to modify the configuration in the future, he recalls the configuration by using the "Load Config" Button 811. In the illustrated example, the administrator has chosen seven new columns, each column from a different output node except for the output node Et_Tline_OTQS that has two new columns ("Material Price" and "Valid From"). The administrator can also change the header of the new columns. In one embodiment, the header of a new column is the name of the attribute of the RFC output model node. The default column name is listed under the column "Attribute Text" 803. In this example, the administrator has changed the header of the new columns by changing the name under the "Header" column 805.

In one embodiment, the unique identifier used to identify each attribute selected by the administrator comprises the node name combined with the attribute name. For example, the last selection shown in FIG. 8 is the attribute Cost_Datval from the node Et_Tline_OTQS, so in this embodiment its unique identifier is Et_Tline_OTQS_Cos_Datval. Regardless of the format used, the unique identifier indicates exactly under which attribute and which model node the data for this column are maintained in the context. As previously mentioned, in one embodiment, the unique identifiers are stored within the configuration data on the local database 280. Subsequently, during runtime, the unique identifiers are retrieved to identify all attributes from all model nodes which are to be included within the table.

Specifically, at runtime, the dynamic table generation logic 275 reads the configuration data from the local database 280 and dynamically creates and populates the new table node attributes. The dynamic table generation logic 275 also dynamically creates the table columns and dynamically maps the cell editors of the table columns to their respective new attributes. Returning to the above example, the "TableExploded" node has its new attributes built dynamically and the names of the new attributes are their unique identifiers. For example, the attribute Cos_Datval of node Et_Line_OTQS is built dynamically using its unique identifier Et_Tline_OTQS_Cos_Datval. The six other attributes illustrated in FIG. 8 are built according their unique identifiers in the same manner.

Once the dynamic attributes and all other table node attribute are populated, the new table columns are built dynamically. As illustrated in FIG. 9, in the above example, the new table has the seven new columns 901-902, two of them are from the Et_Line_OTS RFC output model node and are placed under the column grouped header "Price." Using portal personalization, the administrator can rearrange, if desired, the order of the columns, including the new columns.

In summary, the system and method described above allows application administrator or other user to add new columns to a table. The new columns can be created from any output model node of any RFC call. The additional configuration of the new columns is saved in a permanent layer which is separate from the system database 123. In the embodiments described above, the permanent layer is a local database 280 containing configuration data associated with the application. Because the configuration data is stored separately and used only at runtime, the underlying program code and data for the application (e.g., maintained on the remote system 270) does not need to be modified.

It should be noted that a formal database structure is not required for local storage of the configuration data. For example, the configuration data may be stored within a file system in any type of file format (e.g., text, XML, etc) while still complying with the underlying principles of the invention.

Each new column is identified by a unique identifier which indicates from which RFC output model node, and from which attribute the data for this new column is retrieved. At runtime the following steps take place:

The saved configuration of the new columns is called and read.

The appropriate new attributes of the table node are created dynamically according to the saved configuration.

Each new attribute is populated with the correct data using the unique attribute identifier that indicates where the data are located (i.e., under which RFC model output node and which attribute).

The table columns are built dynamically, one column per new attribute, and their cell editors are respectively mapped to the corresponding attribute.

In addition, one embodiment of the invention also uses the portal personalization techniques described above that allow the administrator to rearrange and hide table columns, thereby increasing the customization possibilities of any tables shown in an application.

Figure 10:
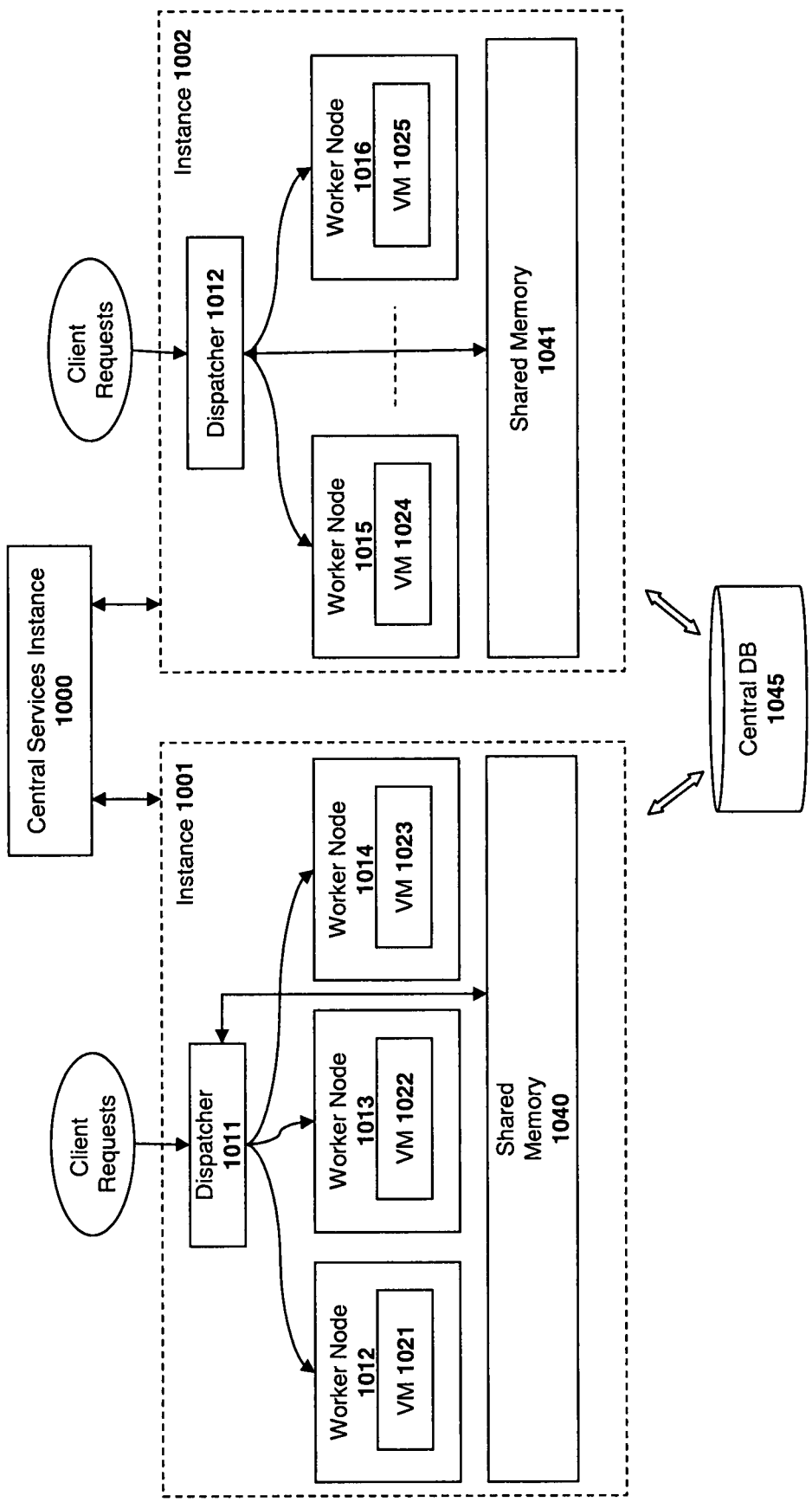
FIG. 10 illustrates a system architecture employed in one embodiment of the invention.

A system architecture on which embodiments of the invention may be implemented is illustrated in FIG. 10. The architecture includes a plurality of application server "instances" 1001 and 1002. The application server instances 1001 and 1002 each include a group of worker nodes 1012-1014 and 1015-1016 (also sometimes referred to herein as "server nodes"), respectively, and a dispatcher 1011 and 1012, respectively. The application server instances 1001, 1002 communicate through a central services instance 1000 using message passing. In one embodiment, the central services instance 1000 includes a locking service and a messaging service (described below). The combination of all of the application server instances 1001 and 1002 and the central services instance 1000 is referred to herein as a "cluster." Although the following description will focus solely on instance 1001 for the purpose of explanation, the same principles apply to other instances within the cluster.

The worker/server nodes 1012-1014 within instance 1001 provide the business and presentation logic for the network applications supported by the system including, for example, the model-video controller architecture described herein.

Each of the worker nodes 1012-1014 within a particular instance may be configured with a redundant set of programming logic and associated data, represented as virtual machines 1021-1023 in FIG. 10. In one embodiment, the dispatcher 1011 distributes service requests from clients to one or more of the worker nodes 1012-1014 based on the load on each of the servers. For example, in one embodiment, the dispatcher maintains separate queues for each of the 1012-1014 in a shared memory 1040. The dispatcher 1011 fills the queues with client requests and the worker nodes 1012-1014 consume the requests from each of their respective queues. The client requests may be from external clients (e.g., browser requests) or from other components/objects within the instance 1001 or cluster.

In one embodiment, the worker nodes 1012-1014 may be Java 2 Enterprise Edition ("J2EE") worker nodes which support Enterprise Java Bean ("EJB") components and EJB containers (at the business layer) and Servlets and Java Server Pages ("JSP") (at the presentation layer). In one embodiment, JSPs are used to implement the different views 702 described above, and servlets are used to implement the controllers 710. In this embodiment, the virtual machines 1021-1025 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

In one embodiment, communication and synchronization between each of the instances 1001, 1002 is enabled via the central services instance 1000. As mentioned above, the central services instance 1000 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 1045. The locking service locks data on behalf of various system components which need to synchronize access to specific types of data and program code. In one embodiment, the central services instance 1000 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 1021-1025. Specifically, in one embodiment, objects such as session objects which are identified as "shareable" are stored within a shared memory region 1040, 1041 and are made accessible to multiple virtual machines 1021-1025. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 1040, 1041 or "heap" is used to store data objects that can be accessed by multiple virtual machines 1021-1025. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the session objects described herein) are put into the shared memory heap in groups known as "shared closures." A shared closure is an initial object plus the transitive closure of all the objects referenced by the initial object.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards.

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Web Dynpro, Java or J2EE implementation, the underlying principles of the invention may be implemented in virtually any client-server environment. Moreover, although some of the embodiments set forth above are implemented within a shared memory environment, the underlying principles of the invention are equally applicable to a non-shared memory environment. Finally, it should be noted that the terms "client" and "server" are used broadly to refer to any applications, components or objects which interact over a network.

Accordingly, the scope and spirit of the invention should be judged in terms of the claims which follow.

What is claimed is:

1. A computer-implemented method comprising:
displaying a plurality of attributes, each attribute comprising a column of data, from multiple different model nodes of an application, the multiple different model nodes comprising models of output nodes of multiple function calls that are made to a remote system, each output node comprising a table at the remote system, each model node of the multiple different model nodes populated with data each based on a particular discrete function call to the remote system, the particular discrete function call associated with the particular model node;
providing, by a computer system, a user interface allowing a user at runtime to select a set of attributes from the plurality of attributes to be displayed as columns within a table, the table being managed by a controller and presented to the user as one or views through a model-view-controller architecture having context nodes including multiple different model nodes that reference an external object that saves the data and value nodes that save the data itself, the table further being associable with only a single context node;
providing a help routine to display names of all context nodes responsive to a request by the user;
receiving an identification of the set of attributes selected by the user, the selection of attributes causing a mapping between the model nodes and a single
node, the value node having one column corresponding to each selected attribute and rows populated with data corresponding to the attribute in each model node; and
storing the identification of the set of attributes as configuration data within local data storage, the identification of set of attributes comprising a unique identifier for each attribute and the local data storage being separate from a data storage of the remote system in which the program code and data for the application is maintained;
receiving a user request to generate a table view;
reading the configuration data including the identification of the set of attributes selected by the user;
using the identification of the set of attributes to retrieve data associated with the attributes from the data storage of the remote system using multiple function calls;
populating the table with columns representing the set of attributes, each row of each column containing the data retrieved from the data storage of the remote systems;
providing a cell editor to edit data in at least one cell of the table by an end user when the table is not in a read only mode.

2. The method as in claim 1 wherein the identification of the set of attributes comprises a model node name identifying a model node in which the attribute is maintained and an attribute name, wherein the combination of the model node name and the attribute name uniquely identify the attribute within the data storage of the remote system.

3. The method as in claim 1 further comprising:
transmitting a remote function call (RFC) in response to the user request, the RFC causing remote functions to be invoked on the remote system; and
receiving data resulting from the invocation of the remote functions in the one or more model nodes.

4. The method as in claim 1 wherein the user interface comprises a table having a plurality of rows and columns, wherein one of the columns comprises a plurality of selection boxes, one for each row, and wherein each row corresponds to a different attribute of a different model node, wherein to select a particular attribute to be included in the table, the user selects the selection box associated with the row of that attribute.

5. A system comprising a memory for storing program code and a processor for processing the program code to perform the operations of:
displaying a plurality of attributes, each attribute comprising a column of data, from multiple different model nodes of an application, the multiple different model nodes comprising models of output nodes of multiple function calls that are made to a remote system, each output node comprising a table at the remote system, each model node of the multiple different model nodes populated with data each based on a particular discrete function call to the remote system, the particular discrete function call associated with the particular model node;
providing, by a computer system, a user interface allowing a user at runtime to select a set of attributes from the plurality of attributes to be displayed as columns within a table, the table being managed by a controller and presented to the user as one or views through a model-view-controller architecture having context nodes including multiple different model nodes that reference an external object that saves the data and value nodes that save the data itself, the table further being associable with only a single context node;

providing a help routine to display names of all context nodes responsive to a request by the user;

receiving an identification of the set of attributes selected by the user, the selection of attributes causing a mapping between the model nodes and a single node, the value node having one column corresponding to each selected attribute and rows populated with data corresponding to the attribute in each model node; and storing the identification of the set of attributes as configuration data within local data storage, the identification of set of attributes comprising a unique identifier for each attribute and the local data storage being separate from a data storage of the remote system in which the program code and data for the application is maintained;

receiving a user request to generate a table view;

reading the configuration data including the identification of the set of attributes selected by the user;

using the identification of the set of attributes to retrieve data associated with the attributes from the data storage of the remote system using multiple function calls;

populating the table with columns re resenting the set of attributes each row of each column containing the data retrieved from the data storage of the remote systems;

providing a cell editor to edit data in at least one cell of the table by an end user when the table is not in a read only mode.

6. The system as in claim 5 wherein the identification of the set of attributes comprises a model node name identifying a model node in which the attribute is maintained and an attribute name, wherein the combination of the model node name and the attribute name uniquely identify the attribute within the data storage of the remote system.

7. The system as in claim 6 comprising additional program code to cause the processor to perform the operations of:

transmitting a remote function call (RFC) in response to the user request, the RFC causing remote functions to be invoked on the remote system; and receiving data resulting from the invocation of the remote functions in the one or more model nodes.

8. The system as in claim 5 wherein the user interface comprises a table having a plurality of rows and columns, wherein one of the columns comprises a plurality of selection boxes, one for each row, and wherein each row corresponds to a different attribute of a different model node, wherein to select a particular attribute to be included in the table, the user selects the selection box associated with the row of that attribute.

9. The system as in claim 5 wherein the local data storage comprises a first database and wherein the data storage of the remote system comprises a second database.

10. A non-transitory machine-readable medium having program code stored thereon which, when executed by a machine, causes the machine to perform the operations of:

displaying a plurality of attributes, each attribute comprising a column of data, from multiple different model nodes of an application, the multiple different model nodes comprising models of output nodes of multiple function calls that are made to a remote system, each output node comprising a table at the remote system, each model node of the multiple different model nodes populated with data each based on a particular discrete function call to the remote system, the particular discrete function call associated with the particular model node;

providing, by a computer system, a user interface allowing a user at runtime to select a set of attributes from the plurality of attributes to be displayed as columns within a table, the table being managed by a controller and presented to the user as one or views through a model-view-controller architecture having context nodes including multiple different model nodes that reference an external object that saves the data and value nodes that save the data itself, the table further being associable with only a single context node;

providing a help routine to display names of all context nodes responsive to a request by the user;

receiving an identification of the set of attributes selected by the user, the selection of attributes causing a mapping between the model nodes and a single node, the value node having one column corresponding to each selected attribute and rows populated with data corresponding to the attribute in each model node; and storing the identification of the set of attributes as configuration data within local data storage, the identification of set of attributes comprising a unique identifier for each attribute and the local data storage being separate from a data storage of the remote system in which the program code and data for the application is maintained;

receiving a user request to generate a table view;

reading the configuration data including the identification of the set of attributes selected by the user;

using the identification of the set of attributes to retrieve data associated with the attributes from the data storage of the remote system using multiple function calls;

populating the table with columns representing the set of attributes each row of each column containing the data retrieved from the data storage of the remote systems;

providing a cell editor to edit data in at least one cell of the table by an end user when the table is not in a read only mode.

11. The non-transitory machine-readable medium as in claim 10 wherein the identification of the set of attributes comprises a model node name identifying a model node in which the attribute is maintained and an attribute name, wherein the combination of the model node name and the attribute name uniquely identify the attribute within the data storage of the remote system.

12. The non-transitory machine-readable medium as in claim 10 comprising additional program code to cause the machine to perform the operations of:

transmitting a remote function call (RFC) in response to the user request, the RFC causing remote functions to be invoked on the remote system; and receiving data resulting from the invocation of the remote functions in the one or more model nodes.

13. The non-transitory machine-readable medium as in claim 10 wherein the user interface comprises a table having a plurality of rows and columns, wherein one of the columns comprises a plurality of selection boxes, one for each row, and wherein each row corresponds to a different attribute of a different model node, wherein to select a particular attribute to be included in the table, the user selects the selection box associated with the row of that attribute.

14. The non-transitory machine-readable medium as in claim 10 wherein the local data storage comprises a first database and wherein the data storage of the remote system comprises a second database.

* * * * *

UNITED STATES PATENT AND TRADEMARK OFFICE
CERTIFICATE OF CORRECTION

| | | |
|---|---|---|
| PATENT NO. | : 8,589,394 B2 | Page 1 of 1 |
| APPLICATION NO. | : 11/998537 | |
| DATED | : November 19, 2013 | |
| INVENTOR(S) | : Peter Vignet | |

It is certified that error appears in the above-identified patent and that said Letters Patent is hereby corrected as shown below:

In the Claims

Column 9, Claim 1, line 67, please delete "or views" and insert --or more views--.

Column 10, Claim 1, lines 10-11, please delete "single (paragraph return) node" and insert --single node-- (creating one text block out of two).

Column 11, Claim 8, line 2, please delete "or views" and insert --or more views--.

Column 11, Claim 8, lines 12-13, please delete "single (paragraph return) node" and insert --single node-- (creating one text block out of two).

Column 11, Claim 8, line 28, please delete "re resenting" and insert --representing--.

Column 11, Claim 8, line 29, please delete "attributes each" and insert --attributes, each--.

Column 12, Claim 10, line 8, please delete "or views" and insert --or more views--.

Column 12, Claim 10, lines 18-19, please delete "single (paragraph return) node" and insert --single node-- (creating one text block out of two).

Column 12, Claim 10, line 35, please delete "attributes each" and insert --attributes, each--.

Signed and Sealed this
First Day of July, 2014

Michelle K. Lee
*Deputy Director of the United States Patent and Trademark Office*